United States Patent [19]

Ephrath et al.

[11] Patent Number: 5,041,967

[45] Date of Patent: Aug. 20, 1991

[54] METHODS AND APPARATUS FOR DYNAMIC MENU GENERATION IN A MENU DRIVEN COMPUTER SYSTEM

[75] Inventors: Arye R. Ephrath, Clinton; Patrick M. Gibbons, Westfield; Constance A. Halpin, Somerset; Mary A. Smith, Hoboken; Michelle S. Wolberg, Branchburg, all of N.J.

[73] Assignee: Bell Communications Research, Inc., Livingston, N.J.

[21] Appl. No.: 108,208

[22] Filed: Oct. 13, 1987

[51] Int. Cl.⁵ ............................................. G06F 3/153
[52] U.S. Cl. .................................. 364/200; 364/286.2
[58] Field of Search ... 364/200 MS File, 900 MS File

[56] References Cited

U.S. PATENT DOCUMENTS

| | | | |
|---|---|---|---|
| 4,520,457 | 5/1985 | Hagler et al. | 364/900 |
| 4,611,306 | 9/1986 | Crehan et al. | 364/900 |
| 4,658,359 | 4/1987 | Palatucci et al. | 364/900 X |
| 4,823,283 | 4/1989 | Diehm et al. | 364/518 |
| 4,829,423 | 5/1989 | Tennant et al. | 364/200 |
| 4,843,538 | 6/1989 | Lane et al. | 364/200 |

*Primary Examiner*—Thomas M. Heckler
*Attorney, Agent, or Firm*—James W. Falk; Leonard Charles Suchyta

[57] ABSTRACT

A computer hardware (FIG. 1) and software (FIG. 2) system uses a plurality of multilevel, hierarchical menus (FIG. 3) to access basic system capabilities. The menu system is made flexible, and responsive to the needs of individual users by means of a menu table (FIGS. 4 and 7) containing the menu entry text for all menus, the identity of the menu on which the entry is to appear, and the action to be taken if that menu entry is selected. The menu table can be edited by the user (15) in response to local needs and is used to generate (FIG. 5) all menus of the menu system dynamically, on the fly, as needed. In one embodiment, the menu table is broken up into separate tables for each menu level. In another embodiment, secondary menu item selection criteria are added to the menu table entries to further condition menu entry selection on user attributes such as geography or time.

15 Claims, 6 Drawing Sheets

| MENU TABLE | | |
|---|---|---|
| ITEM TEXT | MENU | ACTION |
| TEXT FOR ENTRY 1 IN MENU A-1 | A-1 | DISPLAY B-1 |
| TEXT FOR ENTRY 2 IN MENU A-1 | A-1 | DISPLAY B-2 |
| TEXT FOR ENTRY 3 IN MENU A-1 | A-1 | DISPLAY B-3 |
| TEXT FOR ENTRY n IN MENU A-1 | A-1 | DISPLAY B-n |
| TEXT FOR ENTRY 1 IN MENU B-1 | B-1 | DISPLAY C-1 |
| TEXT FOR ENTRY 2 IN MENU B-1 | B-1 | DISPLAY C-2 |
| TEXT FOR ENTRY n IN MENU B-1 | B-1 | DISPLAY C-n |
| TEXT FOR ENTRY 1 IN MENU B-2 | B-2 | DISPLAY C-n+1 |
| TEXT FOR ENTRY 2 IN MENU B-2 | B-2 | DISPLAY C-n+2 |
| TEXT FOR ENTRY n IN MENU B-n | B-2 | DISPLAY C-2n |
| TEXT FOR ENTRY 1 IN MENU B-n | B-n | DISPLAY C-■(n-1)+1 |
| TEXT FOR ENTRY 2 IN MENU B-n | B-n | DISPLAY C-■(n-1)+2 |
| TEXT FOR ENTRY n IN MENU B-n | B-n | DISPLAY C-■n |
| TEXT FOR ENTRY 1 IN MENU M-1 | M-1 | EXECUTE P-1 |
| TEXT FOR ENTRY 2 IN MENU M-1 | M-1 | EXECUTE P-2 |
| TEXT FOR ENTRY n IN MENU M-1 | M-1 | EXECUTE P-n |
| TEXT FOR ENTRY 1 IN MENU M-2 | M-2 | EXECUTE P-n+1 |
| TEXT FOR ENTRY 2 IN MENU M-2 | M-2 | EXECUTE P-n+2 |
| TEXT FOR ENTRY n IN MENU M-2 | M-2 | EXECUTE P-2n |
| TEXT FOR ENTRY 1 IN MENU M-n | M-n | EXECUTE P-■(n-1)+1 |
| TEXT FOR ENTRY 2 IN MENU M-n | M-n | EXECUTE P-■(n-1)+2 |
| TEXT FOR ENTRY n IN MENU M-n | M-n | EXECUTE P-n■ |

| MENU TABLE | | |
|---|---|---|
| ITEM TEXT | MENU | ACTION |
| TEXT FOR ENTRY 1 IN MENU A-1 | A-1 | DISPLAY B-1 |
| TEXT FOR ENTRY 2 IN MENU A-1 | A-1 | DISPLAY B-2 |
| TEXT FOR ENTRY 3 IN MENU A-1 | A-1 | DISPLAY B-3 |
| . | . | . |
| TEXT FOR ENTRY n IN MENU A-1 | A-1 | DISPLAY B-n |
| TEXT FOR ENTRY 1 IN MENU B-1 | B-1 | DISPLAY C-1 |
| TEXT FOR ENTRY 2 IN MENU B-1 | B-1 | DISPLAY C-2 |
| . | . | . |
| TEXT FOR ENTRY n IN MENU B-1 | B-1 | DISPLAY C-n |
| TEXT FOR ENTRY 1 IN MENU B-2 | B-2 | DISPLAY C-n+1 |
| TEXT FOR ENTRY 2 IN MENU B-2 | B-2 | DISPLAY C-n+2 |
| . | . | . |
| TEXT FOR ENTRY n IN MENU B-n | B-2 | DISPLAY C-2n |
| TEXT FOR ENTRY 1 IN MENU B-n | B-n | DISPLAY C-m(n-1)+1 |
| TEXT FOR ENTRY 2 IN MENU B-n | B-n | DISPLAY C-m(n-1)+2 |
| . | . | . |
| TEXT FOR ENTRY n IN MENU B-n | B-n | DISPLAY C-mn |
| TEXT FOR ENTRY 1 IN MENU M-1 | M-1 | EXECUTE P-1 |
| TEXT FOR ENTRY 2 IN MENU M-1 | M-1 | EXECUTE P-2 |
| . | . | . |
| TEXT FOR ENTRY n IN MENU M-1 | M-1 | EXECUTE P-n |
| TEXT FOR ENTRY 1 IN MENU M-2 | M-2 | EXECUTE P-n+1 |
| TEXT FOR ENTRY 2 IN MENU M-2 | M-2 | EXECUTE P-n+2 |
| . | . | . |
| TEXT FOR ENTRY n IN MENU M-2 | M-2 | EXECUTE P-2n |
| TEXT FOR ENTRY 1 IN MENU M-n | M-n | EXECUTE P-m(n-1)+1 |
| TEXT FOR ENTRY 2 IN MENU M-n | M-n | EXECUTE P-m(n-1)+2 |
| . | . | . |
| TEXT FOR ENTRY n IN MENU M-n | M-n | EXECUTE P-nm |

| MENU TABLE | | | |
|---|---|---|---|
| CODE | ITEM TEXT | MENU | ACTION |
| JUM | DATA UPDATE MENU | NDS | DISPLAY |
| SSM | SYSTEM SIMULATOR MENU | NDS | DISPLAY |
| RGM | REPORT GENERATOR MENU | NDS | DISPLAY |
| SDM | SYSTEM DESIGN MENU | NDS | DISPLAY |
| SRM | SYSTEM ROUTING MENU | NDS | DISPLAY |
| MOB | MANUAL OPERATOR MENU | RGM | DISPLAY |
| PRM | PANEL REPORTS MENU | RGM | DISPLAY |
| SDR | SWITCHED DDS MENU | RGM | DISPLAY |
| SRM | STATISTICS REPORTS MENU | RGM | DISPLAY |
| MRM | MISC. REPORTS MENU | RGM | DISPLAY |
| BHR | BUSY HOUR REPORT | SDR | EXECUTE |
| CAR | CAPACITY REPORT | SDR | EXECUTE |
| CDR | COMPONENT DATA REPORT | SDR | EXECUTE |
| MIR | MINIMUM IN-SERVICE REPORT | SDR | EXECUTE |
| MAR | MACHINE ADMIN. REPORT | SDR | EXECUTE |
| BHR | BUSY HOUR REPORT | MOB | EXECUTE |
| CAR | CAPACITY REPORT | MOB | EXECUTE |

| 130 | 131 | 132 | 133 | 134 |
|---|---|---|---|---|
| CODE | ITEM TEXT | MENU I.D. | SECONDARY SELECTION KEY | ACTION |

METHODS AND APPARATUS FOR DYNAMIC MENU GENERATION IN A MENU DRIVEN COMPUTER SYSTEM

TECHNICAL FIELD

This invention relates to user-friendly, menu-driven computer program systems and, more particularly, to multilevel, dynamic menu generation for use in such menu-driven program systems.

BACKGROUND OF THE INVENTION

As the complexity of computer programs has grown and as their capabilities have expanded, it has become increasingly difficult to provide user interfaces sufficiently simple and flexible to be used by inexpert nonprogrammer users. The most common solution to this problem has been to provide multi-layer menus to guide in the selection of specific capabilities of these software systems. That is, the inexpert user is presented with a menu from which a selection is made. Each menu selection triggers the presentation of the next lower level menu until, at the lowest level menu, the menu selection triggers the execution of an appropriate process to carry out the specific program capability identified on the menu entry.

The above-described menu-driven user interface has the great advantage of allowing inexpert users to control and use very powerful and very complex software systems. One problem with such systems, however, is the rigidity of the menu system itself. Such menu systems tend to be complex and interrelated and hence can usually be modified or updated only by highly qualified computer programmers. Moreover, the addition, deletion or modification of the underlying capabilities of the software system is not easily accompanied by the appropriate changes in the menu system.

Because of this tendency towards rigidity in the menu system, different requirements of different users are not possible to accommodate economically. Menu-driven systems therefore tend to be general enough for all possible intended users and therefore somewhat inappropriate for all actual users with different specific requirements.

SUMMARY OF THE INVENTION

In accordance with the illustrative embodiment of the present invention, these and other problems are overcome by the use of user-defined, dynamically generated multilevel menus, the items of which are created or selected concurrently with the creation or selection of the underlying software capabilities. More particularly, a menu table is maintained in the computer memory with an entry for each basic displayable menu item available in the software system. Associated with each of these menu items in the menu table is 1) an identification of the action to be initiated upon selection of that menu item; 2) an identification of the menu in the menu system on which that menu item is to appear; 3) the displayable text of the associated menu item. The menu texts are selectively displayed as menu entries for each identified menu, using the menu identifications as a display selection key. The action to be initiated can, of course, comprise the display of a lower level menu. The highest level menu entries are displayed in response to the initial entry into the software system. One implementation of this dynamic menu generation scheme is described in an article by M. A. Smith entitled "One from Column A, Two from Column B: Generating Menus in Real Time," appearing at page 142 of the *Proceedings of the 1986 IEEE International Conference on Systems, Man, and Cybernetics,* Atlanta, Ga., Oct. 14-17, 1986.

In further accord with the illustrative embodiment of the present invention, the menu table is maintained in full text, easily edited by non-expert users, so that new capabilities (new processes encoded for the system by the system providers or by local experts) can quickly and easily be reflected in the menu system. Unused capabilities can be deleted from the menu system simply by deleting the corresponding entry in the menu table. Menu entry text can be edited to reflect local language usage for more easily identifying the basic software capabilities. Finally, new menu entries can be created simply by adding entries to the menu table.

In accordance with one feature of the present invention, additional fields can be added to the menu table entries to serve as secondary selection keys for menu item selection. Using this technique, the contents of the various displayed menus can be further tailored to individual users by user class (e.g., security clearance), geographical location, time of day, month, year, or any other useful criteria devised by the local user community.

One major advantage of the dynamic menu generation system of the present invention is the ability to add and delete system capabilities and to immediately reflect these changes in the menu system.

Another advantage of the present invention is the ability to customize software systems for specific users, both in the basic capabilities of the system and in the menu names used to refer to these basic capabilities. Moreover, non-expert users, using standard editing tools, can customize the menu entries for the specific user community.

BRIEF DESCRIPTION OF THE DRAWING

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Figure 1:
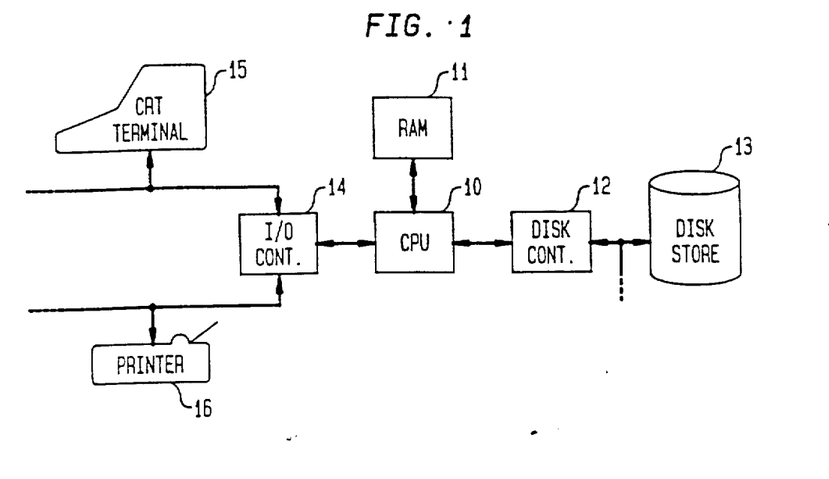
FIG. 1 shows a general block diagram of a computer hardware system in which the present invention might find use.

Referring more particularly to FIG. 1 of the drawings, there is shown a general block diagram of a computer hardware system comprising a Central Processing Unit (CPU) 10 and a Random Access Memory (RAM) unit 11. Computer programs stored in the RAM 11 are accessed by CPU 10 and executed, one instruction at a time, by CPU 10. Data, stored in other portions of RAM 11, are operated upon by the program instructions accessed by CPU 10 from RAM 11, all in accordance with well-known data processing techniques.

Central Processing Unit (CPU) 10 also controls and accesses a disk controller unit 12 which, in turn, accesses digital data stored on one or more disk storage units such as disk storage unit 13. In normal operation, programs and data are stored on disk storage unit 13 until required by CPU 10. At this time, such programs and data are retrieved from disk storage unit 13 in blocks and stored in RAM 11 for rapid access.

Central Processing Unit (CPU) 10 also controls an Input-Output (IO) controller 14 which, in turn, provides access to a plurality of input devices such as CRT (cathode ray tube) terminal 15, as well as a plurality of output devices such as printer 16. Terminal 15 provides a mechanism for a computer operator to introduce instructions and commands into the computer system of FIG. 1, and may be supplemented with other input devices such as card and tape readers, remotely located terminals, optical readers and other types of input devices. Similarly, printer 16 provides a mechanism for displaying the results of the operation of the computer system of FIG. 1 for the computer user. Printer 16 may similarly be supplemented by line printers, cathode ray tube displays, phototypesetters, graphical plotters and other types of output devices.

The constituents of the computer system of FIG. 1 and their cooperative operation are well-known in the art and are typical of all computer systems, from small personal computers to large main frame systems. The architecture and operation of such systems are well-known and, since they form no part of the present invention, will not be further described here.

Figure 2:
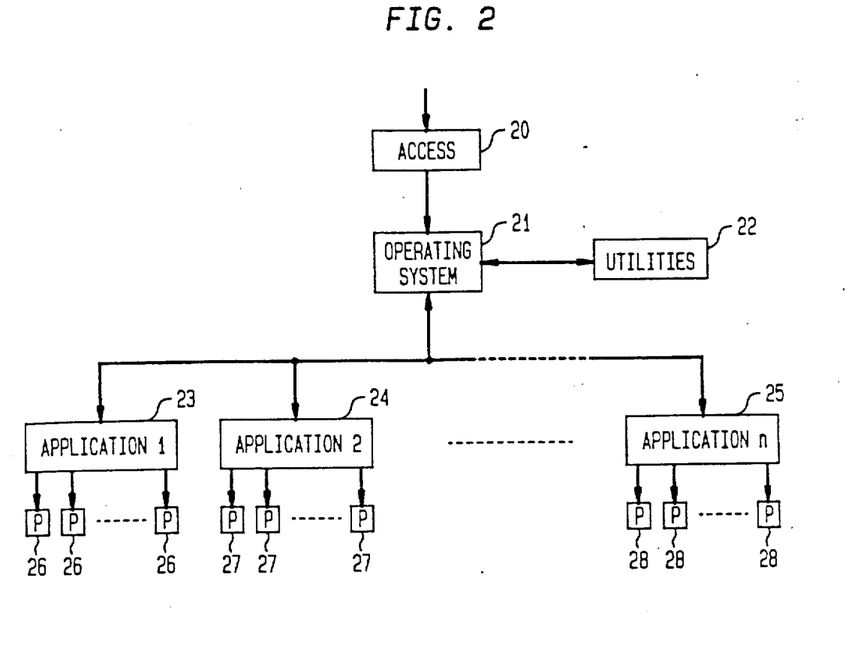
FIG. 2 shows a general block diagram of a computer software system which might be resident on the computer hardware system of FIG. 1 and in which the present invention might find use.

In FIG. 2 there is shown a graphical representation of a typical software architecture for a computer system such as that shown in FIG. 1. The software of FIG. 2 comprises an access mechanism 20 which, for simple personal computers, may comprise no more than turning the system on. In larger systems, providing service to a larger number of users, login and password procedures would typically be implemented in access mechanism 20. Once access mechanism 20 has completed the login procedure, the user is placed in the operating system environment 21. Operating system 21 coordinates the activities of all of the hardware components of the computer system (shown in FIG. 1) and provides a number of utility programs 22 of general use to the computer user. Utilities 22 might, for example, comprise assemblers and compilers, mathematical routines, basic file handling routines and system maintenance facilities.

The computer software system of FIG. 2 typically also includes a plurality of application programs such as application programs 23, 24, . . . 25. Application programs 23–25 might, for example, comprise as editor, a spreadsheet program, a graphics package, a data base manager, and so forth. Each of the application programs 23 through 25 includes or provides access to a plurality of programmed processes 26, 27, . . . 28, respectively. It is the programmed processes 26 through 28 which actually perform the tasks necessary to carry out the purpose of the corresponding application program. In order to make effective use of these application packages, the user must be able to execute the processes 26–28 at the time, and in the sequence, necessary to accomplish the user's goals. It is the proper selection of these application processes 26–28 toward which the present invention is directed.

Figure 3:
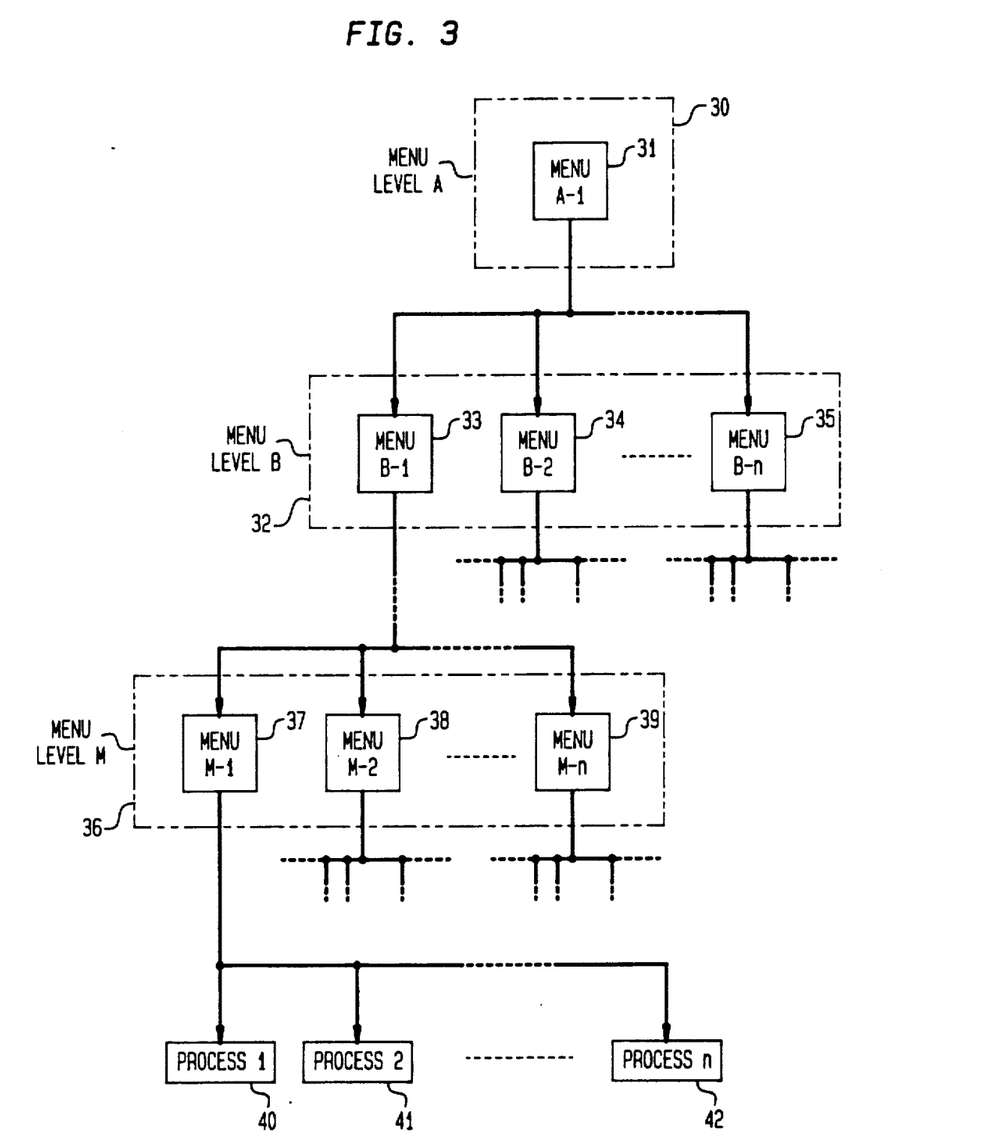
FIG. 3 shows a graphical representation of a multilevel, hierarchical menu system in which the present invention might find use.

Referring then to FIG. 3, there is illustrated a graphical representation of one common and well-known technique for selecting processes for execution in a complex application program system. FIG. 3 shows a multilevel hierarchical menu system comprising a first or highest menu level 30, termed menu level A, and including only one menu 31. Menu 31 comprises a displayable list of a plurality of menu items each one of which, when selected, cause the display of particular one of a plurality of menus at the next lower menu level 32, termed menu level B. Menu level 32 therefore includes a plurality of menus 33, 34, . . . 35, each of the menus in level 32 corresponding to one of the entries on menu 31 in level 30. Each of the menus in level 32, in turn, includes menu entries each one of which provides access to one of a plurality of menus at the next lower menu level. The second-lowest menu level likewise includes a plurality of menus, the entries of each one of which provides access to the lowest menu level 36, termed menu level M. One of the menus at level (M −1), for example, provides access to menus 37, 38, . . . 39 at menu level 36. Menu level 36, being the lowermost menu level, does not provide access to a lower menu level, but instead provides a mechanism for selectively executing one of a plurality of programmed processes 40, 41, . . . 42. Indeed, each of the menus at level 36 provides a mechanism for selecting one of a different plurality of programmed processes similar to processes 40–42.

It can be seen that the menu system of FIG. 3 permits the selection among a very large number of programmed processes in a computer application by users with little or no programming experience. Moreover, the processes can be grouped into categories or classes of processes which are typically used together so that a non-expert user is not even given a choice of selecting totally inappropriate actions. The processes 40–42, as well as all of the other processes in the application package, could just as well have been selected by expert users by properly formatted commands and bypass the menu system entirely. Since each command typically requires one or more command parameters, the presentation of such commands directly is a relatively difficult procedure, even for expert users, and subject to errors requiring that the entire command be reformatted. The menu system obviates these difficulties by using the menus to select process parameters as well as processes.

Hierarchical menu systems such as that disclosed in FIG. 3 are so powerful for controlling complex computer programs that virtually all end-user application programs are controlled with such menu systems. Unfortunately, menu systems such as that described in FIG. 3 are themselves so large and complicated that the design and implementation of the menu system for complex application programs comprises a substantial development effort over and above the system itself. Each of the menu displays must be formatted and stored, and mechanisms devised to search down through the menu tree to the desired task-oriented process. The size and complexity of such hierarchical menu systems tends to render them fixed and inflexible for all users. Moreover, since a large number of users typically uses the same application program, the menu terminology, the menu contents and the menu organization must be designed for the general purpose user. Users, however, have their own lexicon of terminology and their own subset of uses for the typical general purpose application program. The inflexible designs of the menu systems of the prior art, however, did not permit any local variations.

In accordance with one embodiment of the present invention, complex menu systems such as that illustrated in FIG. 3 are implemented by the use of a single or a very few menu tables containing all of the information necessary to dynamically generate all of the menus of the menu system on the fly, as called for by the user. The table includes the actual text of the menu entries, an identification of the menu or menus on which that menu text entry is to appear, and the identification of the action to be taken if that menu entry is selected. A fourth menu entry may be provided to assist in the selection of the menu item, such as a mnemonic or numerical key which, when entered at a terminal such as terminal 15 in FIG. 1, serves to select that menu entry. one such table, using the nomenclature described in connection with FIG. 3, is show in FIG. 4.

Figure 4:
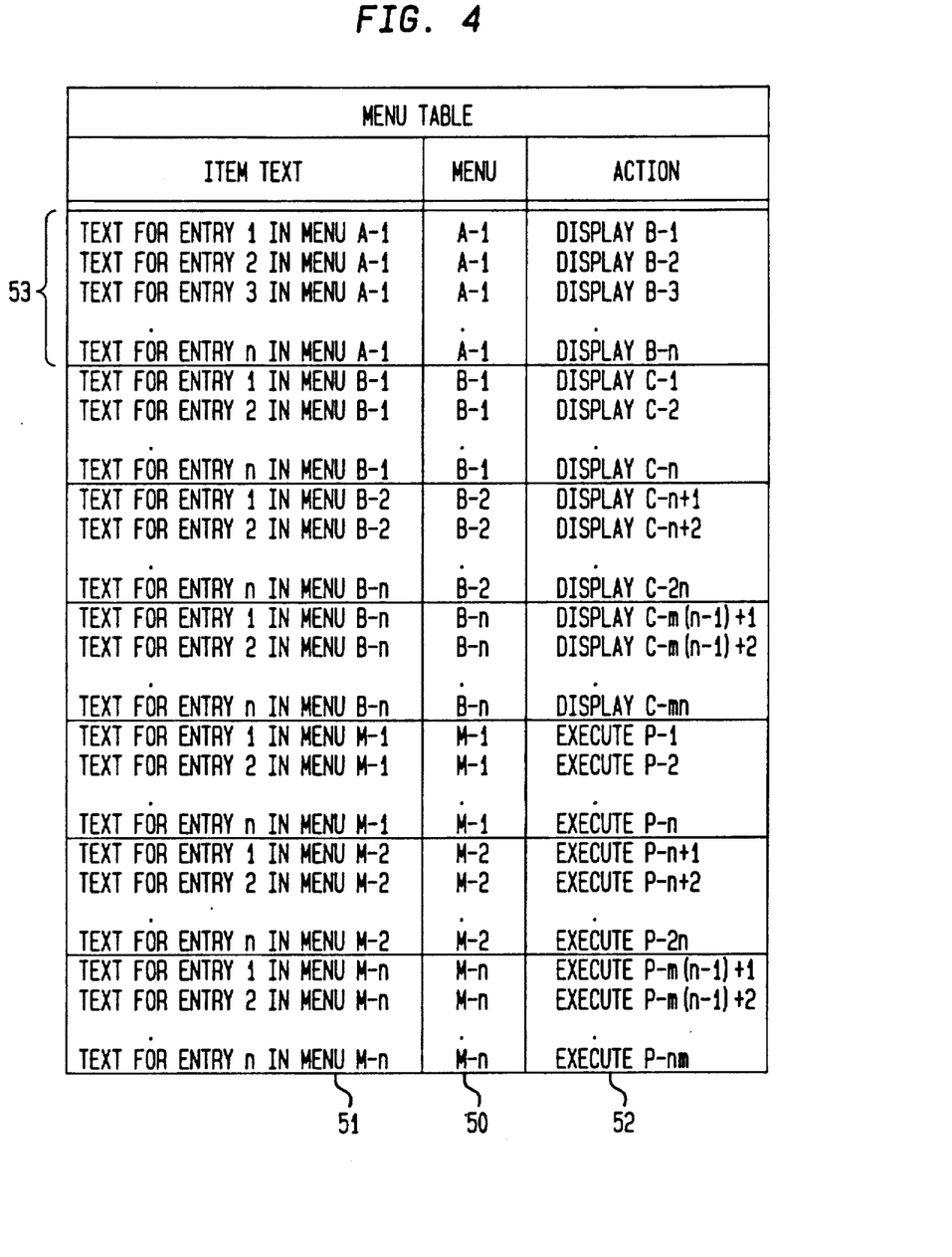
FIG. 4 shows a graphical representation of a storage table for storage inside the computer system of FIG. 1 which, in accordance with the present invention, can be used to dynamically generate the menu system of FIG. 3.

As is readily apparent from FIG. 4, the various menus can be generated dynamically, on the fly, by keying on the MENU entry (column 50 in FIG. 4). That is, using the MENU entry as a key, all menu items on that menu can be selected from the table of FIG. 4 for display. The actual text displayed is contained in the first field of FIG. 4, shown as column 51. Finally, the selection of any menu entry triggers the associated action, identified in column 52 of FIG. 4. This action comprises either the display of a lower level menu, or the execution an identified process. It will be noticed that the entire menu system is contained in the single table of FIG. 4. Any simple and well-known mechanism for selectively displaying the table text and executing the identified action can be used. Furthermore, a simple editor can be used to alter the table contents to suit a particular user. That is, menu entries can be deleted if a particular user has no need for that particular capability. If customized processes are written for a particular user, that process can be easily added anywhere in the existing menu system simply by inserting an appropriate line in the menu table of FIG. 4. Finally, the displayed menu entry text of column 51 can be customized for each user to reflect the local nomenclature for the particular tasks performed by the executable processes, using standard editing tools.

It should be recognized that FIG. 4 can be broken up into two or more tables for convenience in storing or utilizing the table. It may be desirable, for example, to separate the menu entries for each different level into a different table, thereby avoiding the need for level identifiers in the table entries.

Figure 5:
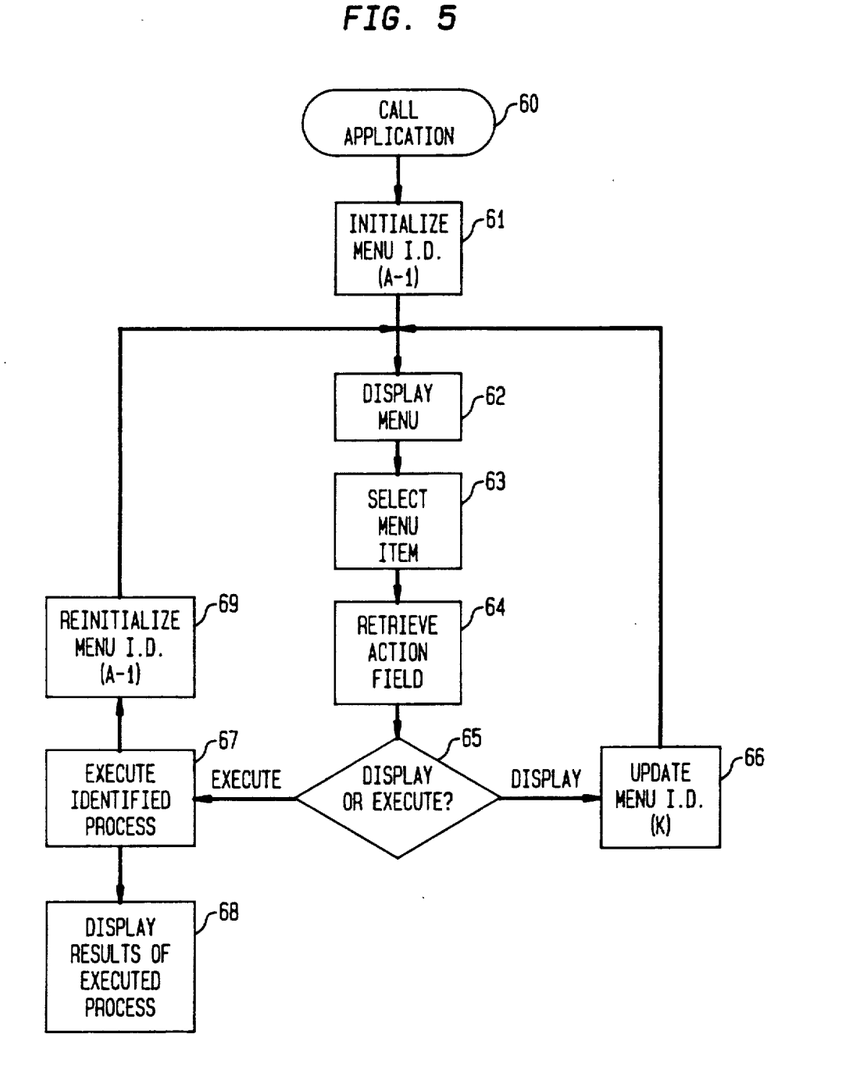
FIG. 5 shows a graphical representation of a flow chart for the display and utilization of a multilevel hierarchical menu system in accordance with the present invention.

In FIG. 5 there is shown a flow chart of a menu-generating utility program which could be used with the menu table of FIG. 4 to dynamically generate the menu system of FIG. 3. The flowchart of FIG. 5 comprises an entry point 60 where the particular application is entered. This application program, of course, corresponds to the menu system of FIG. 3. Once the application is called at entry point 60, the menu identification is initialized in box 61. As can be seen in FIG. 3, the initial menu identification is "A−1," using the nomenclature of FIG. 3. Using this menu identification as a key, the appropriate items (lines) from the table of FIG. 4, lines 53, are read out and displayed to the user in box 62. Using the displayed menu as a guide, the user then selects the desired menu entry in box 63.

A typical method for selecting menu entries from a cathode ray tube display involves the use of a movable cursor on the screen controlled by a "mouse," i.e., an x-y position sensor. The mouse is used to move the cursor to the desired menu selection and a key depressed to make the actual selection. Other methods of selecting menu items involve the use of a "lightpen" (a source of light manually moved to a desired position on a light sensitive matrix overlaying the cathode ray screen), a touch-sensitive screen, or simply by typing an identification of the menu entry on the keyboard. To assist this latter form of selection, the menu display might include mnemonic or numerical identifiers for each entry of the menu.

Once the menu entry is selected in box 63, the action field (column 52 of FIG. 4) is retrieved in box 64. In decision box 65, the contents of the action field is examined to determine if the desired action is to display a menu or to execute a process. If the action is a display action, box 66 is entered where the menu identification is updated from the initializing value (or previous value) to the new value provided from the action field. Using this new menu identifier, the menu table is again accessed in box 62 to display the new menu by selecting only those table entries corresponding to the new menu identifier. This menu selection and identification loop is traversed until the lowermost menu level is reached, as shown in FIG. 3.

If the action field 52 (FIG. 3) specifies a process execution, then the identified process is called and executed in box 67. If appropriate, the results of the execution of the process in box 67 are displayed to the user in box 68. At the same time, the menu identification is reinitialized in box 69 and the topmost level meru redisplayed in box 62. This traversal of the menu hierarchy and execution of a selected process can be reiterated as many times as is required to carry out the goals of the user. Alternatively, the system can be set up such that the inputting of any menu identifier will trigger the display of the corresponding menu, as will be described below.

In accordance with one feature of the present invention, the Select Menu Item box 63 of FIG. 5 can be arranged to respond to any menu identification, including menus which are not displayed for selection. The user can therefore enter the menu identification of any menu in the menu system, including the initial menu, and get that menu displayed without the necessity of traversing the entire menu hierarchy. In this way, experienced users are able to move at random through the menu system, moving directly to the menu wanted without traversing the higher level menus in the menu hierarchy.

It will be appreciated that the operations called for in the flowchart of FIG. 5 can be readily implemented by those skilled in the art for a large number of different software systems in a large number of different source languages.

Figure 6:
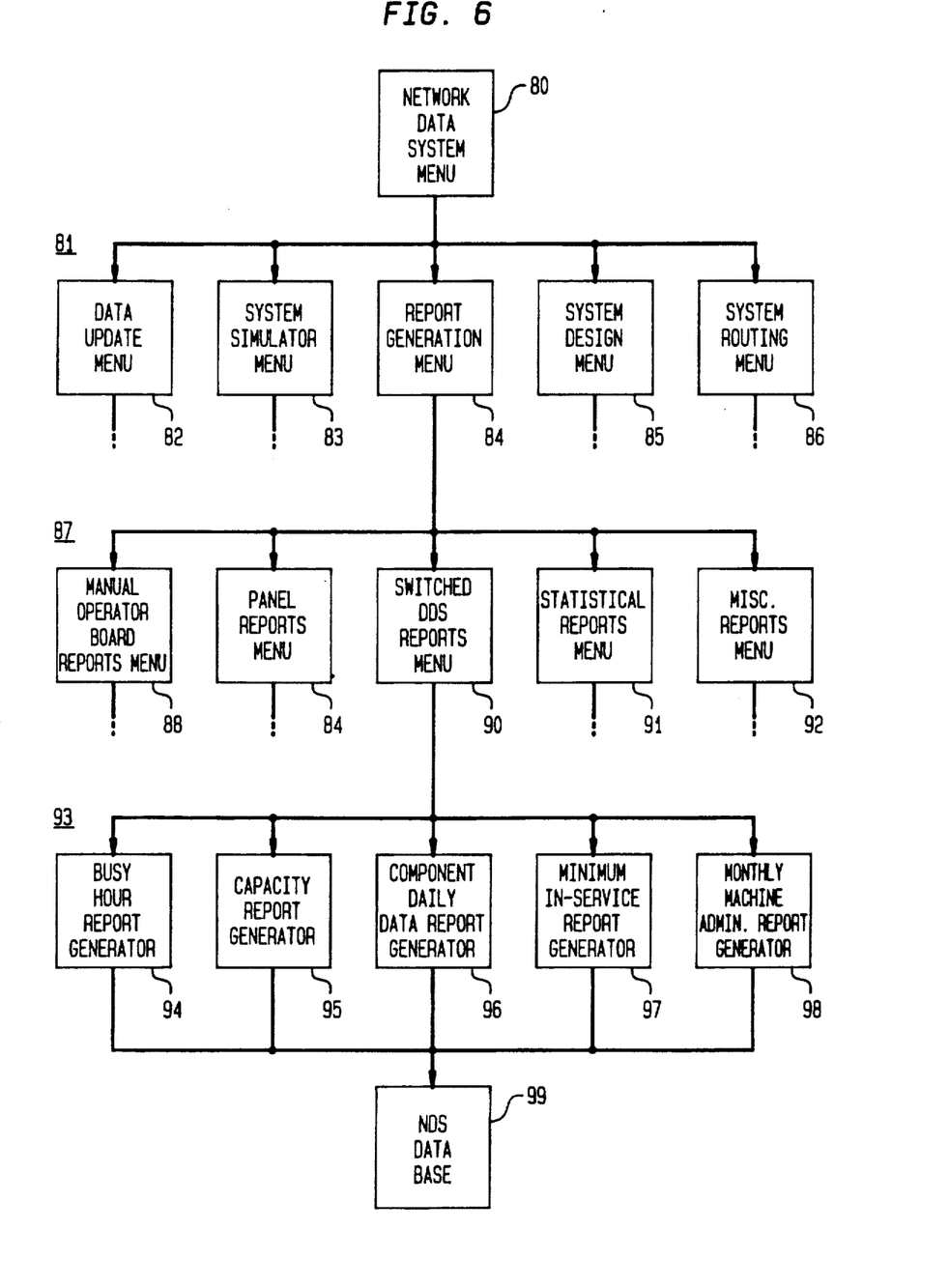
FIG. 6 shows a graphical representation of a multilevel, hierarchical menu system in accordance with the present invention for use in a telephone network data system application.

Referring then to FIG. 6, there is shown a menu system, similar to the menu system of FIG. 3, but specific to a particular application program called the Network Data System (NDS). The Network Data System application program is used in the telephone industry to create, maintain and use a data base reflecting all of the various physical components in a typical telephone serving area. These components include transmission systems, cables, switching machines, and so forth used to provide telephone service.

The highest level menu 80 of FIG. 6, the Network Data System menu, includes, for the purposes of illustration, only five menu items and, when displayed using the procedure of FIG. 5, appears as follows:

TABLE I

| NETWORK DATA SYSTEM | |
|---|---|
| ENTER | TO ACCESS: |
| DUM | DATA UPDATE MENU |
| SSM | SYSTEM SIMULATION MENU |
| RGM | REPORT GENERATION MENU |
| SDM | SYSTEM DESIGN MENU |
| SRM | SYSTEM ROUTING MENU |

Figure 7:
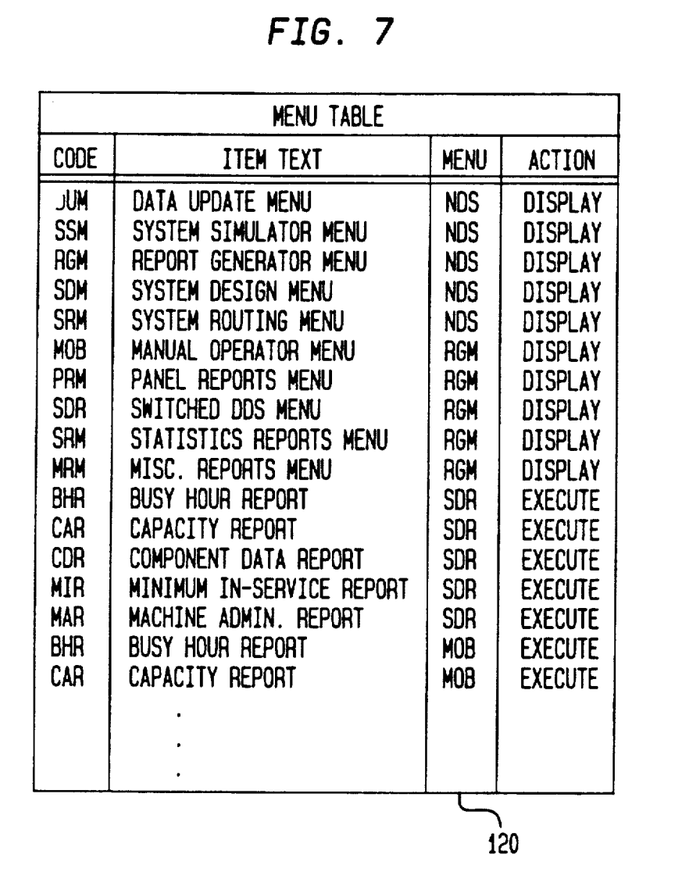
FIG. 7 shows a graphical representation of a menu storage table for use with the menu system of FIG. 6.

In FIG. 7 there is shown the menu table which could be used to generate the menu system of FIG. 6. It can be seen that the menu of Table I includes only those entries of the menu table of FIG. 7 having the menu identifier "NDS" (Network Data System) in column 120 of the menu table. These five entries correspond to the five menus of the second level 81, including menus 82 through 86, of FIG. 6. Assuming that the "RGM" (Report Generator Menu) entry on Table I were selected by typing "RGM," the next lower level 87 menu would be displayed, including menus 88 through 92 in FIG. 6 and including those items in the menu table of FIG. 7 identified in column 120 by the RGM identifier. This level 87 menu would be displayed as shown in Table II:

TABLE II

| REPORT GENERATION MENU | |
|---|---|
| ENTER | TO ACCESS: |
| MOB | MANUAL OPERATOR BOARD MENU |
| PRM | PANEL REPORTS MENU |
| SDR | SWITCHED DDS REPORTS MENU |
| SRM | STATISTICS REPORTS MENU |
| MRM | MISCELLANEOUS REPORTS MENU |

Each of the other menus at level 81 in FIG. 6 are similarly made up of entries in the menu table of FIG. 7. These entries, however, are not shown in FIG. 7 in order to keep the explanation brief and simple. Appropriate entries, similar to those shown in FIG. 7, can readily be devised by those skilled in the art to accommodate user needs.

Assuming that the "SDR" entry of Table II is selected, the resulting menu display, corresponding to level 93 in FIG. 6, would appear as shown in Table III:

TABLE III

| SWITCHED DDS REPORTS MENU | |
|---|---|
| ENTER | TO ACCESS: |
| BHR | BUSY HOUR REPORT |
| CAR | CAPACITY REPORT |
| CDR | COMPONENT DATA REPORT |
| MIR | MINIMUM IN-SERVICE REPORT |
| MAR | MACHINE ADMINISTRATION REPORT |

It will be noted that the entries in Table III no longer correspond to lower level menus, but instead call for the generation of specific reports. The selection of one of the entries on Table III therefore results in the execution of a process to generate the identified report. These processes are identified at level 93 in FIG. 6 as processes 94 through 98. Each of these processes 94-98 accesses the NDS data base 99 to retrieve the date necessary to generate the report.

It will be noted that the last two entries of the menu table of FIG. 7 duplicate the CODE and ITEM TEXT fields of previous table entries. The entries in column 120, however, are different. It is therefore possible, in accordance with the present invention, to provide duplicate menu entries on different menus simply by making duplicate entries in the menu table. In the illustrative example, it is perfectly reasonable to provide the Busy Hour Report option on the Manual Operator Board Reports Menu as well as the Switched DDS Reports Menu.

It should also be noted that not all telephone service areas have all of the equipment types specified in level 87 of the menu system of FIG. 6. If no manual operator boards are present, for example, the MOB entries in the menu table of FIG. 7 could be omitted and MOB would never appear as an option on the menu. Similarly, the text in the ITEM TEXT field of the menu table of FIG. 7 can be edited to reflect the local nomenclature for the identified function, thus making the menu system easier for local users to use.

Figure 8:
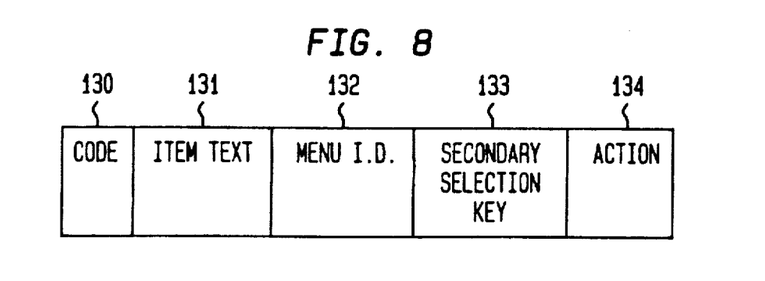
FIG. 8 shows a graphical representation of a single entry in a menu table such as the menu table of FIG. 7 showing a secondary menu item selection criteria field in the menu table entry.

In FIG. 8 there is shown a single menu table entry including a "CODE" field 130, an "ITEM TEXT" field 131, a "MENU I.D." field 132 and an "ACTION" field 134, Mall similar to the corresponding fields in the menu table of FIG. 7. Also included in the menu table entry of FIG. 8 is a "SECONDARY SELECTION KEY" field 133. The contents of field 133 can be used as a secondary key by the selection box 63 in FIG. 5 to select only a subset of the menu items identified by menu identification field 132. In this way, the contents of a menu display can be further tailored to individual user communities by yet another level of selection. This secondary selection can be made on the basis of geography (where the user is located), time (when the user is accessing the menu system), user class (which user, e.g., security clearance class), and so forth. Indeed, more than one secondary selection field can be included in each menu item entry of FIG. 8. Thus additional selection criteria can be applied to each menu entry selection to insure that only appropriate menu entries are displayed for every user.

It should also be clear to those skilled in the art that further embodiments of the present invention may be made by those skilled in the art without departing from the teachings of the present invention.

What is claimed is:

1. A menu-driven digital data processing system comprising means for storing a menu entry data record in said system for each item of a first plurality of displayable menu items of a second lesser plurality of displayable menus, each said record including a menu field identifying one or more of said second plurality of displayable menus on which the associated menu item is to appear, a text field including the displayable text of the associated menu item, and an action field identifying the action to be initiated in response to the selection of the associated menu item;

means responsive to the contents of said menu field for selectively displaying all of the menu items identified as appearing on a common identified menu, means for selecting at least one of said displayed menu items, and means responsive to the selection of said at least one displayed menu item for initiating the action identified in the action field of the record associated with the selected menu item.

2. The menu-driven digital data processing system according to claim 1 further comprising menu entry record editing means for adding, deleting and modifying said menu entry record fields.

3. The menu-driven digital data processing system according to claim 1 wherein at least one of said actions to be initiated by the selection of a menu item on a first identified menu comprises the display of a second differently identified menu by said displaying means.

4. The menu-driven digital data processing system according to claim 1 wherein each said record further comprises at least one secondary selection criteria field for storing at least one restrictive display criteria, and said means for selectively displaying menu items being responsive to the contents of said at least one secondary selection criteria field.

5. A display system for dynamically generating all of the menus of a multilevel hierarchical menu system comprising storage means for storing a plurality of menu entry records, each said menu entry record including the identification of the menu containing such menu entry and the contents of such menu entry, means for storing an identification of the action to be taken upon the selection of any one of said menu entries in association with said menu identification and said menu entry content for the same menu entry, and means, utilizing said storage means, for selectively displaying only one of said menus in said menu system by selectively retrieving from said menu entry records only the menu contents of menu entries having the same menu identification.

6. The display system according to claim 3 further comprising means for storing a secondary menu entry selection criteria for selectively enabling said means for selectively displaying said menus.

7. A method of dynamically providing the menus of a hierarchical menu-driven digital data processing system comprising the steps of storing a menu entry data record in said system for each item of a first plurality of displayable menu items of a second lesser plurality of displayable menus, each said record including a menu field identifying one or more of said second plurality of displayable menus on which the associated menu item is to appear, a text field including the displayable text of the associated menu item, and an action field identifying the action to be initiated in response to the selection of the associated menu item;

in response to the contents of said menu field, selectively displaying all of the menu items identified as appearing on a common identified menu, and in response to the selection of a displayed menu item, initiating the action identified in the action field of the record associated with the selected menu item.

8. The method according to claim 7 further comprising the step of editing the menu entry records by adding, deleting and modifying said menu entry record fields.

9. The method according to claim 7 further comprising the step of responding to the selection of a menu item on a first identified menu by displaying a second differently identified menu.

10. The method according to claim 7 further comprising the steps of storing in said menu entry data records one or more secondary menu selection criteria, and utilizing said secondary menu item selection criteria to selectively enable said step of selectively displaying menu items.

11. A method for dynamically generating all of the menus of a multilevel hierarchical menu system comprising the steps of storing a plurality of menu entry records, each said menu entry record including the identification of the menu containing such menu entry and the contents of such menu entry, storing an identification of the action to be taken upon the selection of any one of said menu entries in association with said menu identification and said menu entry content for the same menu entry, and selectively displaying only one of said menus in said menu system by selectively retrieving from said menu entry records only the menu contents of stored menu entries having the same menu identification.

12. The method according to claim 11 further comprising the steps of storing one or more secondary menu item selection criteria to be used to condition said step of selectively displaying menu entries.

13. A menu display system for use with computer programs comprising means for storing a menu entry record for each displayable line of each menu of said menu system, each said menu entry record including at least one menu entry selection key, and means, responsive to said at least one selection key, for displaying only those menu lines corresponding to menu entry records including the same selection key.

14. The menu display system according to claim 13 wherein said selection key includes a menu identification.

15. The menu display system according to claim 13 wherein said selection key includes user specification criteria limiting the displayed menu items for users with different specifications.

* * * * *